United States Patent Office 3,443,702
Patented May 13, 1969

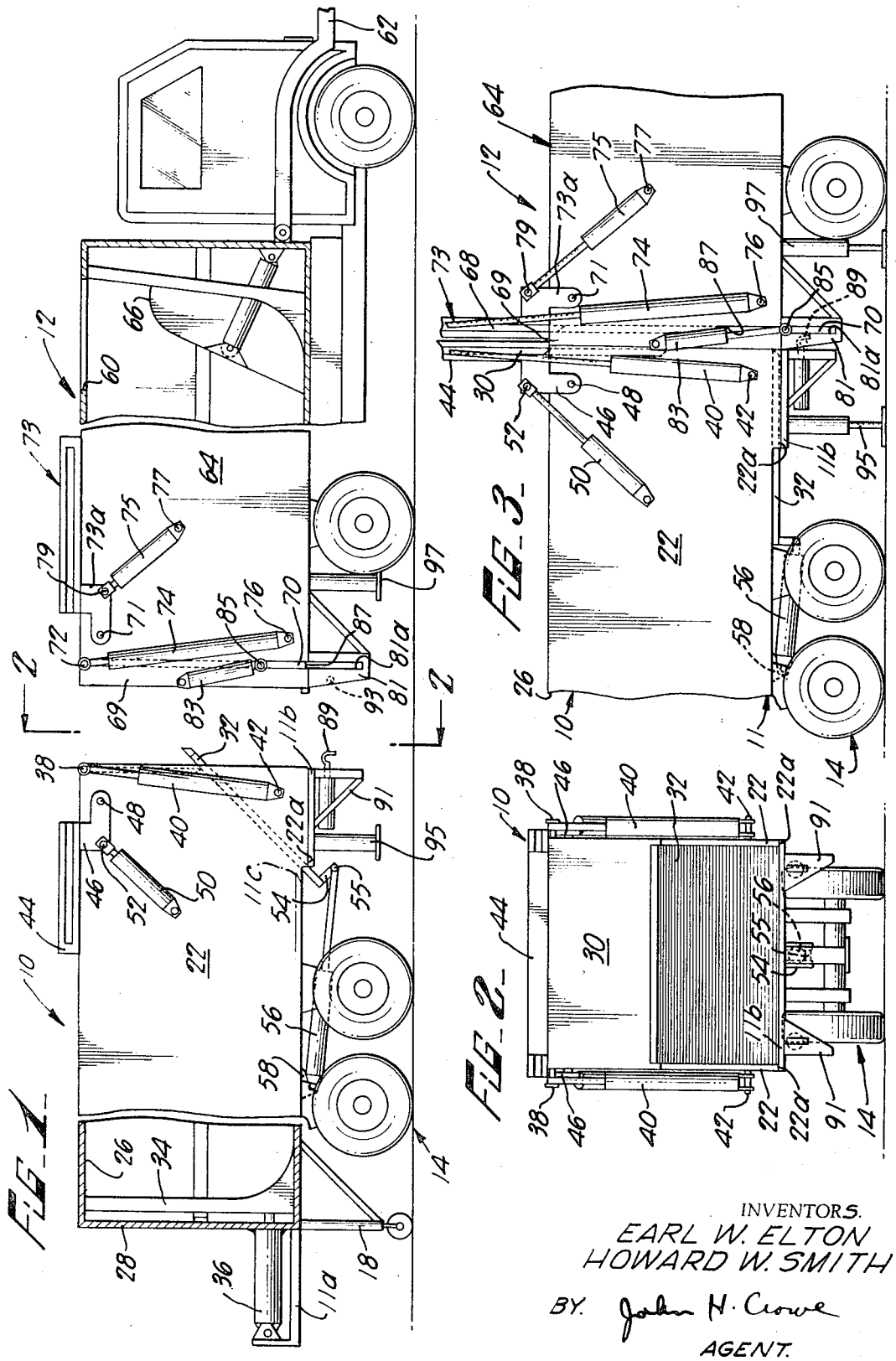

3,443,702
CARGO TRANSFER BETWEEN VEHICLES
Earl W. Elton, 257 E. Dexter St., and Howard W. Smith, 740 N. Park Ave., both of Covina, Calif. 91722
Filed June 6, 1966, Ser. No. 555,328
Int. Cl. B65g *67/02;* B65f *3/00;* B62d *33/04*
U.S. Cl. 214—38                                                          6 Claims

ABSTRACT OF THE DISCLOSURE

A combination of a pickup truck for collecting garbage and a semitrailer for bulk hauling of the collected garbage to a dump. The truck and semitrailer are designed to be backed together and held in rear end adjacency. Each of the vehicles has a body with tailgate members and an internal blade suitable for garbage emptying purposes. The loaded truck and unloaded semitrailer can be backed together and their tailgates opened. The internal blade of the truck can then be actuated to transfer garbage to the semitrailer. After the semitrailer is full, it can be driven to a dump for discharge of its load.

---

This invention relates generally to refuse collection and disposal means. More particularly, the invention relates to such means adapted to permit the consolidation of loads of trash or garbage from separate refuse pickup trucks for long distance hauling purposes by the direct transferance of such refuse from the pickup trucks to bulk cargo carrier vehicles.

The obvious necessity for quick, clean and effective methods of refuse disposal, particularly in larger cities and towns, has posed an increasing number of problems in recent years. Refuse disposal problems reach their greatest magnitude in the larger metropolitan areas where great quantities of refuse accumulate daily, and where refuse disposal sites are often far removed from the areas of greatest trash and garbage accumulation.

The type of vehicle best suited for the collection of refuse from homes, stores, restaurants, and the like, is not ideally suited for the hauling of such refuse to disposal sites, particularly where the hauling distances are relatively great. In this connection, the initial refuse collection, or pickup, vehicle is preferably one of easy maneuverability, adapted to operate at relatively slow speeds in crowded city and residential areas and designed for quick and effective loading by a crew of, typically, two or three persons. A vehicle best suited for the hauling of collected refuse to disposal sites, on the other hand, should be one capable of carrying a maximum quantity of cargo at the highest permissible speed and requiring a minimum number of crew members. Ideally, the hauling vehicle should be a large semitrailer, with the necessary accessory equipment, operable by a single tractor driver, whereas the initial pickup trucks should be smaller, more maneuverable vehicles staffed by crews of adequate size to drive and load them.

It goes without saying that the use of relatively small refuse pickup vehicles for hauling collected refuse long distances to remote dumps is unduly expensive, both from the standpoint of wear and tear on the equipment and operating costs. Moreover, conventional refuse pickup trucks are inefficient long distance carriers and their crews are not used to best efficiency when all but one remain idle, as during long trips to disposal sites.

In spite of the above-noted disadvantages of the use of trash and garbage pickup trucks for the long distance hauling of refuse to disposal sites, this practice is followed in the great majority of present day trash and garbage disposal operations in the United States. One proposed method of avoiding some of the problems created by the dual pickup and hauling demands on conventional refuse removal equipment involves the installation of permanent way stations intermediate refuse pickup routes and dump, or other disposal, sites for the collected refuse. Such way stations are typically ramp and platform affairs onto which the pickup trucks are driven and unloaded, either directly or by means of an intermediate receiving and reloading facility, into long haul carriers. While way stations of this sort eliminate the necessity of hauling refuse great distances in trucks ill-suited for the purpose, they are characterized by disadvantages of relatively high installation cost and lack of mobility, the latter being a serious handicap in preventing way station movement from one location to another to compensate for shifts in population growth, zoning law changes, etc.

The present invention provides means for carrying out a radically new technique for the disposal of trash and garbage, undisadvantaged by the above-noted shortcomings of the practice of hauling refuse to disposal sites in conventional pickup trucks or the above-described "way station" system of refuse disposal. Briefly, this technique involves the use of one or more enclosed trucks with rearwardly directed internal packer blades for the initial pickup operation, and at least one enclosed carrier vehicle, preferably of high enough load capacity to hold several pickup truck loads of refuse, for use in transporting the refuse to a dump, or other disposal, site. The carrier vehicle is ideally a semitrailer which can be easily parked in a location convenient to the termini of several routes serviced by refuse pickup trucks, thus making it easy for the pickup trucks to reach it after they have made their rounds. Moreover, unlike the permanent way stations of previous reference, the carrier vehicle can be temporarily stationed at any convenient location and moved at will, by a single driver, as the occasion demands.

The preferred refuse pickup trucks of this invention are similar in many ways to conventional pickup trucks of the type having a forwardly extending bin to receive trash or garbage and a loading mechanism to swing the bin, when loaded, over the front end of the truck to a receptive opening in the top of the truck body into which it dumps its load, and the preferred carrier vehicle is, as previously indicated, similar in many respects to a conventional semitrailer. Both the pickup trucks and carrier vehicle differ from such conventional vehicles, however, in critical tailgate, and other, features which permit back-to-back truck-carrier coupling and subsequent intercommunication therebetween. These features, as will be apparent, set the vehicles of our invention sharply apart from their conventional counterparts and make it possible to transfer refuse directly from an initial pickup truck to a long-distance carrier, a feat heretofore impossible insofar as we are aware.

A key advantage of the use of our novel refuse handling equipment not heretofore mentioned is that it makes effective refuse disposal operation with smaller pickup trucks than those presently used in many communities possible. The latter trucks, it is significant to note, are frequently of high load capacity (many, for example, being of 44 cubic yard capacity) to keep the number of trips to disposal sites to a minimum. Since the use of refuse disposal rolling stock in accordance with this invention eliminates the necessity of hauling refuse to disposal sites in pickup trucks, the latter can be relatively small size and still function effectively. The use of smaller pickup trucks in lieu of larger ones results in capital cost, depreciation and operating cost savings and, concomitantly, the use of our carrier vehicle (in lieu of large pickup trucks) for dump haul purposes, is economically advantageous in that the carrier vehicle has a considerably longer life than any pickup truck, an advantage compounded by the fact that it is spared the abuses to which pickup trucks are subjected in service.

To help give an idea of cost differences between the use of refuse collecting equipment in accordance with this invention and equipment of a more conventional character, a suitable pickup truck for use in our novel method of trash disposal could, for example, be a single axle vehicle of 16-cubic yard capacity. Considering a pickup truck of 44-cubic yard capacity as the conventional standard, and comparing its various cost factors (such a truck is normally of the double-axle variety, as those familiar with refuse collecting equipment will appreciate) with comparable cost factors for the substantially smaller 16-yard truck mentioned above, will serve to emphasize the substantial savings which can be achieved through the use of our novel refuse collecting means and method.

It is thus a principal object of this invention to provide a relatively cheap and practical method for the collection and disposal of refuse.

It is a more specific object of the invention to provide means for carrying out such a method characterized by substantially lower maintenance and operating costs than means presently used for refuse collecting purposes.

It is another object of the invention to provide means for carrying out the aforesaid method characterized by sufficient mobility to permit its rapid availability for use wherever needed.

Other objects, features and advantages of the invention will appear in the light of the description to follow, considered conjunctively with the accompanying drawing showing preferred pickup truck and long haul carrier means of the invention, of which:

FIGURE 1 is an interrupted side elevation, partly in section and partly fragmentary, of a refuse pickup truck and refuse-receiving trailer suitable for purposes of this invention, the truck and trailer being shown with their tailgates closed and in approaching proximity to rear-end abutment.

FIGURE 2 is a rear elevation of the refuse-receiving trailer, taken along line 2—2 of FIGURE 1.

FIGURE 3 is a fragmentary side elevation of the truck and trailer, showing the two vehicles coupled together in rear end abutment and with their tailgates open.

Considering now the drawings in greater detail, there is shown generally at 10 a refuse-receiving trailer equipped with accessory means to permit its loading for long haul carrier use in accordance with this invention, and at 12 a refuse pickup truck with accessory means to permit its unloading into the trailer in a manner later to be described. Trailer 10 is, in many respects, like a conventional semitrailer, but it differs therefrom in critically significant tailgate details, as will hereinafter be described in detail. Much the same thing can be said with respect to the similarity of refuse pickup truck 12 to a conventional garbage truck of the type having a forwardly extending loading bin of the above-discussed type.

Trailer 10 has a conventional chassis comprising a bed 11, with a forwardly extending section 11a, to which a tractor cab can be attached for hauling purposes, a rear wheel assembly 14 and a swivel-wheeled front supporting wheel assembly 18. The body of the trailer is of rectangular cross section and permanently enclosed at its sides, top, bottom and front by side walls 22, top 26, bed 11 and front wall 28, respectively. The rear end of the trailer body can be opened and closed for loading and unloading purposes by means of hyraulically powered upper and lower tailgate members 30 and 32, respectively, operable in a manner subsequently to be described. Fitting slidingly, and substantially congruently, within the trailer body is a pusher blade 34. Blade 34 is powered by a telescoping, double-acting hydraulic cylinder 36 so mounted above forward extending section 11a of the trailer bed as to extend through a suitably sized aperture in front wall 28 of the trailer body to connective contact with said blade.

Hydraulic cylinder 36 is mounted with its axis parallel to the bed of the trailer and so oriented as to be extensible in the proper direction to urge pusher blade 34 slidably to the rear of the trailer body for refuse unloading purposes. The cylinder is of telescoping character to permit adequate piston extension for clearance of the trailer of refuse by the pusher blade during the trailer unloading operation. FIGURE 1 shows the pusher blade-hydraulic cylinder assembly in the fully retracted position which it assumes, as will be seen, when the trailer is fully loaded. From this position, the blade travels to the right, as viewed, to perform its trailer unloading function. Hydraulic cylinder 36 is double-acting in the sense that it resists pressure acting on pusher blade 34 in the direction of cylinder retraction when the cylinder is extended. This resistance, as will be appreciated, has a packing effect on refuse being loaded into the trailer, thereby helping to increase the load-carrying capacity of the latter and achieve greater economy of operation. Double-acting hydraulic cylinder and pusher blade assemblies of the here-involved type are so well known as to obviate any present necessity for more detailed discussion of the pusher blade 34 assembly.

Upper tailgate member 30 of trailer 10 is of flat configuration and sized to neatly cover the upper half of the rear opening of the trailer, and it has an outwardly extending pin 38 fixedly secured to each of its lateral edges near the top. A pair of equally sized hydraulic cylinders 40 are pivotally anchored to the exterior sides of the trailer body by means of a pair of anchor pins 42, as shown, each in such position and orientation as to be symmetrical, with respect to the other, about a vertical plane bisecting the trailer body in the longitudinal direction, and to reach, when retracted, to, and drivingly connect with, the nearest pin 38 of the upper tailgate member 30 when the latter is in its closed position, as shown in FIGURE 1.

The respective linkages between hydraulic cylinders 40 and pins 38 are of such character, and all involved parts so cooperatively positioned and oriented, that upper tailgate member 30 is lifted clear of the rear trailer opening by the cylinders when they are actuated, or pressurized, from their retracted (see FIGURE 1) to their extended (see FIGURE 3) positions. The upper tailgate member is, conversely, lowered back into the trailer opening, or closed, when the hydraulic cylinders are subsequently depressurized. Grooves of suitable size and location are provided near the rear of the interior walls of the trailer as retaining and guide channels for the lateral edges of upper tailgate member 30 at rest and during its up and down travels between closed and open positions. The manner in which the tailgate member is opened and closed will be apparent from the foregoing comments and the necessary controls for operation of hydraulic cylinders 40, while not shown, can be of any type known or obvious to those skilled in the art, hence need not here be described in detail.

Disposed transversely across the top of the body of trailer 10 is a guide and support member 44 for upper tailgate member 30. Guide and support member 44 is pivotally secured to the trailer body by means of a pair of pins 48 projecting outwardly from its sides, and it comprises two elongate, U-shaped segments of equal size and configuration, each having two prongs spaced to provide room for loosely sliding fit of upper tailgate member 30 flatwise therebetween; a connecting bar joining the closed ends of the U-shaped segments in such fashion as to hold the segments parallelly symmetrical about a transverse bisector thereof; and a pair of right-angled legs 46 attached to symmetrically opposite prongs of said U-shaped segments. Legs 46 are so spaced and oriented as to straddle the trailer body and parallelly flank its sides, in close but nonbinding adjacency, when the guide and support member is properly positioned across its top. The legs provide the necessary pivotal connection between the guide and support member and the trailer body by attachment, near their outer extremities, to the aforesaid pins 48 which are, as will be apparent, symmetrically anchored to the opposite sides of the trailer.

Legs 46 of guide and support member 44 are so sized and shaped, and pins 48 so positioned, as to permit pivotal movement of said member between an upright position over upper tailgate member 30 (illustrated in FIGURE 3) and a position of folded flatness against the trailer top (illustrated in FIGURES 1 and 2). When the guide and support member is disposed in the former (upright) position, the spaces between the prongs of its elongate, U-shaped segments are vertically oriented over the lateral edges of upper tailgate member 30, and thus in a receptive position relative to the latter when it is powered from its closed to its open position by hydraulic cylinders 40. When the guide and support member is in such an upright position, that end of each of its U-shaped segments disposed inboard of the space between its prongs bears downwardly on the trailer top to help retain the member in place and prevent its pivotal movement in a clockwise direction from its position as viewed in FIGURE 3. As will now be clear, guide and support member 44 serves, as its name implies, a guide and support function for tailgate member 30 during its movements between open and closed positions, as well as serving to support the tailgate member upright in its open position.

The movement of guide and support member 44 within its arc of permissible travel is controlled by a pair of hydraulic cylinders 50, each pivotally, and symmetrically, anchored at one end to an opposite side of trailer 10, and pivotally connected at the other end to the leg 46 of said member closest thereto. The point of pivotal connection between each of hydraulic cylinders 50 and the nearest leg of the guide and support member is a pin 52 positioned near the outer corner of the 90-degree bend in the leg, as shown particularly well in FIGURES 1 and 3. Hydraulic cylinders 50 are, as will be apparent, positioned substantially parallel to, and near (but nonbindingly so) the respectively opposite sides of the trailer. The cylinders are so designed and installed as to insure correlation of their retracted positions with the folded position of guide and support member 44, illustrated in FIGURES 1 and 2, and proper arm length and leverage to induce movement of that member to its upright position (shown in FIGURE 3) from its folded one, when actuated. As those skilled in the art will appreciate, cylinders 50, when pressurized, serve to maintain guide and support member 44 in its upright position, and when depressurized permit it to fold against the top of trailer 10 to the position of previous reference shown in FIGURES 1 and 2.

Lower tailgate member 32 is, as the drawing shows, of flat, plate-like construction and so mounted as to swing between an open position in which it lies flush against the trailer bed (as shown in FIGURE 3) and a closed position in which it is disposed at an angle of inclination between the trailer floor and the bottom of upper tailgate member 30 (as shown in FIGURES 1 and 2). Member 32 is dimensioned to substantially bridge the distance between the trailer walls but clear them sufficiently to permit its swinging movement between the above-described open and closed positions.

To permit lower tailgate member 32 to swing between the aforesaid open and closed positions, the bed of trailer 10 is constructed with a rear portion 11b downwardly offset from its remaining part, this being accomplished by providing the trailer side walls with downwardly displaced bottom edges 22a of equal fore-and-aft dimensions of the proper magnitude to accommodate the offset portion of the bed, increasing the transverse dimension of the latter to such an extent that it reaches under the displaced bottom edges of the trailer walls, and fastening it in place against said bottom edges, all as illustrated in the drawing.

The distance of downward displacement of bottom edges 22a of the trailer walls is slightly greater than the thickness of lower tailgate member 32, and that part of the trailer bed disposed forwardly of its downwardly offset portion 11b is fixedly secured between the lower edges of the trailer walls, with its surface flush with the lower wall edges. By means of this bed and wall construction, a slot of sufficient size to receive lower tailgate member 32 flatwise and in horizontally slidable relationship with the trailer bed is provided. To insure greater leeway for the above-described swinging travel of the lower tailgate member between its open and closed positions, that portion of the trailer bed disposed forwardly of the aforesaid slot terminates a little short of the forward edge of rear portion 11b of the bed. The resulting rear edge of the forwardly disposed portion of the trailer bed is beveled to a knife edge at its lower surface, as shown at 11c, primarily to minimize resistance to refuse movement along the floor of the trailer when the tailgate is in its open position, the significance of which will be better understood in the light of disclosures to come.

Lower tailgate member 32 of trailer 10 has two parallelly disposed pin bracket members 54 depending perpendicularly from the transverse center of its underside adjacent its forwardly disposed end. Pin bracket members 54 support the two ends of a pin 55 which, in turn, supports the piston end of a hydraulic cylinder 56. The latter support is of pivotal character, and hydraulic cylinder 56 extends directly forwardly under trailer 10 to pivotal support at its opposite end by a bracket and pin assembly 58 dependently attached to the underside of trailer bed 11 in transversely central position thereunder. Here, as elsewherein the illustrated embodiment of our invention, the involved parts are sized, shaped and positionally oriented relative to each other to assure their functional cooperation for purposes of the invention as taught herein.

Pickup truck 12 is, as previously indicated, of the overhead bin dumping type, having a conventional type of cab; a trash receiving bin with support structure and dumping controls to maintain it in forwardly extending position for loading purposes and permit its swinging movement over the cab and into dumping orientation relative to a top opening 60 in the body of the truck for truck loading purposes (the whole assembly being shown fragmentarily at 62 in FIGURE 1), all in accordance with known means for accomplishing same; a refuse receiving body 64 of rectangular cross section and sized to match the body of trailer 10 in cross sectional dimensions; and a hydraulically actuated packer blade 66, so mounted within the body of the truck as to operate in a rearwardly oriented direction therewithin for refuse packing purposes during periods of refuse pickup and to aid in the unloading of trash through the rear of the truck in a manner soon to be described, the blade being illustratively shown in its forwardmost position within the truck in FIGURE 1 of the drawing. All parts of pickup truck 12 so far described are conventional in the sense that generally similar counterparts can be found on conventional refuse pickup trucks of the above-described overhead bin dumping type. Packer blade 66 is therefore shown somewhat symbolically, rather than in detailed form, in the drawing, to avoid the necessity of illustrating structural detail superfluous for purposes of this disclosure.

In addition to the above-noted parts, refuse pickup truck 12 has wheels, undercarriage structure and various other integral and accessory parts and assemblies of the type common to conventional trash and garbage pickup trucks and hence not necessary to describe in any greater detail here. The pickup truck unloads from the rear, as do many conventional refuse pickup trucks, but its resemblance to such conventional trucks there ceases since it is characterized by a unique tailgate assembly designed to permit its conjunctive usage with trailer 10 in a manner hereinafter to be explained. Such conjunctive usage is made possible by the fact that the truck and trailer are designed for coupling in such a way as to permit cargo transfer from the former to the latter through their respective rear openings, this capability being, in a sense, the essence of our invention.

In the latter connection, the rear, or tail, end of truck 12 has upper and lower tailgate members 68 and 70, respectively, which correspond generally to upper and lower tailgate members 30 and 32, respectively, of the trailer. However, unlike the trailer tailgate members, those of the truck are both mounted to ride between open and closed positions in pathways perpendicularly disposed to the walls, top and bottom, of the truck body, only the upper of the trailer tailgate members being so mounted in the trailer body. Tailgate members 68 and 70 differ in size inter se to a substantially greater extent than do their trailer 10 counterparts and have an inverse size variance relationship in that the lower tailgate member is the smaller of the two rather than just the opposite as in the case of the trailer tailgate members. The reason for this can be attributed primarily to differences in the amount of space available to accommodate each of the two lower tailgate members in their open positions, as will be better understood in the light of disclosures to follow.

Upper tailgate member 68 is slidably mounted in a pair of oppositely positioned slots symmetrically indenting the inner walls of the truck body in vertical alignment and situated a relatively short, but functionally significant, distance inboard of the rear edges of the truck body walls. The aforesaid slots serve as vertical tracks for retaining the lateral edges of upper tailgate member 68 and guiding that member in its travels between open and closed positions. One of the tracks is partially shown in dotted lines, and its inboard distance from the rear edges of the truck body walls indicated at 69, in FIGURES 1 and 3. The reason for such inboard spacing of the tailgate grooves, or tracks, will become more evident as the present description proceeds.

Projecting laterally from the upper ends of the side edges of upper tailgate member 68 are two pins 72, only one of which can be seen on the drawing. Pins 72 are fixedly secured to, or integral with, the tailgate member and they are of equal size and shape and symmetrically positioned about a vertical plane through the longitudinal axis of the body of the truck. Pivotally secured to the pins 72 are the respective piston ends of two hydraulic cylinders 74. Hydraulic cylinders 74 are of equal size and are respectively secured at their cylinder ends by pivotal connections with a pair of pins 76, only one of which can be seen on the drawing, symmetrically affixed, relative to the aforesaid vertical plane through the truck body, to the sides of the latter.

Hydraulic cylinders 74 are so sized and otherwise characterized, and pins 76 so positioned, as to assure positive upward movement of tailgate member 68, and consequent opening of the upper part of the rear of the truck, by the cylinders when pressurized, and coincidence of upper tailgate member closure with full retraction of the cylinders. The top of the truck body is properly shaped to permit the above-described movements of tailgate member 68, the same thing being true, incidentally, of the top of trailer 10 relative to the movements of tailgate member 30. Finally, the side walls of the truck have receptive notches in their upper edges for tailgate member pins 72, the notches being sized and configured to admit the pins to a sufficient depth to support the tailgate member in the closed position with its upper edge at the same level as the top of the truck body. The same thing is true of the side walls of trailer 10 with respect to receptive notches for support of pins 38 of upper tailgate member 30.

Pivotally secured to the sides of pickup truck 12, by means of a pair of pins 71 projecting outwardly therefrom (only one of which can be seen on the drawing) is a guide and support member 73 for upper tailgate member 68. Guide and support member 73, similarly to guide and support member 44 for the upper tailgate member of trailer 10, comprises two elongate, U-shaped segments of equal size and configuration, each having two prongs spaced to provide room for sliding fit of tailgate member 68, in its flat position, therebetween; a connecting bar joining the closed ends of the elongate, U-shaped members in such fashion as to hold the segments parallel and symmetrical about a transverse bisector thereof; and a pair of angled legs 73a, only one of which can be seen on the drawing, attached to symmetrically opposite prongs of the elongate, U-shaped segments. Angled legs 73a are bent at right angles, similarly to the way legs 46 of guide and support member 44 are bent, and they are attached to the aforesaid prongs of the elongate, U-shaped segments of guide and support member 73 similarly to the way legs 46 are attached to counterpart prongs of the elongate, U-shaped segments of guide and support member 44.

The above-described parts of guide and support member 73 are so sized and shaped, and pins 71 so positioned on the outer walls of the body of truck 12, as to station the guide and support member atop the truck in movable disposition between a position of folded flatness against the top of the truck body (as illustrated in FIGURE 1) and an upright position on the truck body with the spaces between the prongs of its elongate, U-shaped segments vertically oriented over the outer edges of upper tailgate member 68. Legs 73a of the guide and support member are disposed at all times astraddle the truck body, as the drawing illustrates, similarly to the way legs 46 of guide and support member 44 are at all times astraddle the body of trailer 10.

Guide and support member 73 is urged from its folded position against the top of truck 12 to its upright position on the truck by means of a pair of identical hydraulic cylinders 75 (only one of which appears on the drawing) pivotally secured to the sides of the truck body by means of a pair of pins 77, the cylinders being pivotally connected at their cylinder ends to the pins and the pins being symmetrically positioned on the truck body walls relative to a vertical plane longitudinally bisecting the truck body. Hydraulic cylinders 75 are designed and positioned to serve the function of urging guide and support member 73 from its folded to its upright position on the truck top under the control of an operator. This is made possible through linkage of the piston ends of the cylinders to a pair of wrist pins 79 on legs 73a of the guide and support member (only one of which pins can be seen on the drawing), the wrist pins being so positioned at the 90-degree bends of the legs to provide good leverage for carrying out the described manipulation of the guide and support member by the hydraulic cylinders.

As will now, it is believed, be clear, guide and support member 73 and hydraulic cylinders 75 are so sized, shaped, positionally supported on truck 12 and mechanically interlinked as to provide smoothly functioning power for the aforesaid manipulation of the guide and support member. As in the case of guide and support member 44, and its powering cylinders, the folded position of guide and support member 73 coincides with the fully retracted positions of hydraulic cylinders 75, as demonstrated by FIGURE 1, and the upright position of the guide and support member coincides with the extended position of the cylinders, as illustrated by FIGURE 3, the transition from the folded to the upright position of the guide and support member being, of course, accomplished through extension of the hydraulic cylinders and consequent exertion of a crank-like action on the guide and support member to swivel it around pins 71 to said upright position.

As will now be clear, guide and support member 73 and upper tailgate member 68, and their respectively cooperating powering means, functionally cooperate in such fashion as to assure vertically upward movement of the tailgate member for truck opening and refuse removal purposes and guidance and support of the tailgate member during its opening and closing movements and at its position of highest elevation, as seen in FIGURE 3. Controls for hydraulic cylinders 74 and 75 are, of course, present on the truck, although not shown on the drawing since such controls are too well known to require illustration. The same thing is true with respect to all other hydraulic cylinders on truck 12, as well as on trailer 10, except that the control apparatus for the latter are, of course, on the trailer (or its cab) rather than on the truck.

When it is necessary to open the rear end of pickup truck 12, for truck unloading purposes later to be considered, the first step in opening that part covered by upper tailgate member 68 is to crank guide and support member 73 to its upright position by means of hydraulic cylinders 75. After the guide and support member has been cranked upright, upper tailgate member 68 is urged upwardly, with its lateral edges riding in the spaces between the prongs of the elongate, U-shaped segments of the guide and support member until it clears the rear opening of the truck body, in which position it can be held by hydraulic cylinders 75 as long as necessary or desirable. When subsequently closing the rear of the truck, upper tailgate member 68 is lowered into its closed position and guide and support member 73 pivotally eased into its folded position against the truck top by properly sequenced depressurization of hydraulic cylinders 74 and 75.

The foregoing description of the opening and closing of the upper portion of the rear opening of truck 12 through manipulation of upper tailgate closure member 68 is equally applicable with respect to the opening and closing of upper tailgate member 30 of trailer 10 with a proper substitution of corresponding part numbers. The only differences between tailgates 30 and 68 are those of no present significance such as, for example, that size (tailgate 68 being larger than tailgate 30 for reasons later appearing) and position relative to the extreme rear of truck 12 or trailer 10, as the case may be, tailgate 68 being forwardly displaced from the rear of truck 12 a predetermined distance, and tailgate 30 being mounted as close to the rear opening of the trailer as the shapes of the involved parts will permit. The reason for the forward displacement of tailgate 68 from the rear truck opening will, as previously indicated, become clear in the light of disclosures to follow.

Lower tailgate member 70 of truck 12, unlike lower tailgate member 32 of trailer 10, operates vertically between its open and closed positions as do upper tailgate closure members 30 and 68, rather than swiveling between horizontal and vertical positions as the lower tailgate member 32 does. There is a good reason for this difference in tailgate member operation, as will subsequently appear.

Fixedly secured to the underside, and near the rear, of the body of truck 12, are two equally sized and similarly shaped members 81 designed to receive lower tailgate member 70 when it is lowered from its closed (FIGURE 1) to its open (FIGURE 3) position and properly guide it during this maneuver. To achieve the necessary cooperation among the involved parts, each of members 81 has a vertically disposed slot 81a of such size as to snugly receive the lower tailgate member in sliding, but nonbinding, relationship as it is lowered into its open position from its closed one. The lower tailgate receiving members 81, as will be apparent from the drawing and this description, depend from the lateral edges of the body of truck 12 as a result of which orientation they receive and hold the lateral edges of the lower tailgate member during its opening maneuver and in its open position. As a result of this orientation, only one of the members 81 can be seen on the drawing, although the precise location and manner of functioning of the other one will be clearly apparent from the drawing and present description thereof.

Lower tailgate member 70 is opened and closed by means of a pair of hydraulic cylinders 83, symmetrically disposed on the outer walls of the truck body. Similarly to the previously described pairs of hydraulic cylinders accessory to upper tailgate member 68 and guide and support member 73, respectively, hydraulic cylinders 83 are of equal size and each is pivotally mounted at one end to an opposite wall of the truck body. The other end of each cylinder is linked to one of a pair of pins 85 extending perpendicularly outwardly from near the top of a lateral edge of the lower tailgate member, and the cylinder is designed and positionally oriented to serve as powering means for moving the lower tailgate member back and forth between its open and closed positions in the above-indicated and drawing-illustrated manner. It goes without saying that, as in the case of all previously described pairs of matching parts positionally oriented on the sides of truck 12, only one of hydraulic cylinders 83, as well as of the pins 85, shows on the drawing.

It will now be apparent that tailgate receiving members 81 serve somewhat the same guide and support function for lower tailgate member 70 as guide and support member 73 does for upper tailgate member 68. It will also be apparent that the tailgate receiving members are not foldable against the bottom, as is the guide and support member against the top, of the truck, principally because of lack of the necessary folding room under the truck. In a related, but somewhat different, vein, limited accommodative space for the lower tailgate member (in its open position) underneath the truck body is the reason that member is, as previously pointed out, smaller than its upper tailgate member counterpart, the accommodating space for the latter atop the truck being, of course, virtually unlimited.

From the foregoing description of the character of movement, and path of travel between open and closed positions, of tailgate member 70, it will be apparent that its laterally extending pins 85 must move vertcially through the distance of travel of the tailgate member for effective operation of the tailgate assembly. This is made possible by the provision of a pair of vertical slots 87, only one of which shows on the drawing, in the truck body walls sized to serve as guideways for the pins and permit their vertical movement in the above-indicated fashion. Slots 87 are, of course, of a sufficient width to permit sliding, but nonbinding, travel of the pins therewithin. As in the case of the other pairs of tailgate control cylinders of truck 12, as well as those of trailer 10, cylinders 83 are in retraction coincidentally with closure of their interlinked tailgate member, the latter being, of course, opened by extension of the cylinders.

As previously explained, the general idea of our invention is to provide separate pickup and cargo carrying vehicles for refuse handling purposes with built-in capability for intercoupling to permit the transference of refuse from the former to the latter for dump haul purposes. To accomplish such coupling between pickup truck 12 and trailer 10, the two vehicles are jockeyed into tail-end adjacency and substantial alignment with their tailgates closed, after which they are locked together to prevent their separation during the subsequent transfer of refuse from one to the other. Typically, the truck will contain a full load of refuse to be transferred after the coupling maneuver, but it is not necessary that such be the case since a partial load can be so transferred within the scope of our invention. The trailer is, as previously indicated, of large enough capacity to hold several loads from pickup truck 12, or its equivalent.

The truck and trailer are locked together in tail end adjacency, for the above-indicated purpose, by means of a pair of coupling hooks 89 dependently secured to the bed of trailer 10 near its rear corners by means of a pair of hanging brackets 91 shaped and oriented as shown in the drawing. Coupling hooks 89 are of equal size and symmetrical disposition about a vertically bisecting longitudinal plane through the trailer body and they are mounted with their shanks secured in such a way as to permit up and down movement of their hooked ends to a sufficient extent to allow those ends to clear a latch bar 93 attached to truck 12 in a manner subsequently to be described, when the truck and trailer are backed together for coupling in accordance with this invention. Latch bar 93 runs transversely underneath the rear end of truck 12 and is anchored at its ends to lower tailgate receiving members 81 in the manner illustrated in FIGURES 1 and 3.

Hooks 89 are so mounted that their bight, or hooked, ends extend rearwardly beyond the transverse plane of the tail end of trailer 10 in a sufficient distance to fit over latch bar 93 in the manner illustrated in FIGURE 3 when the truck and trailer are backed together as taught herein. The procedure for engaging the hook and latch bar is simple, it being necessary only to lift the bight ends of the hooks over the latch bar as the vehicles are brought to tail end adjacency, after which the hooks remain in place on the latch bar under the influence of gravity, spring biasing, or other suitable force harnessed for the purpose in the described coupling assembly.

Depending from the underside, near the rear, of the trailer and truck beds are two hydraulic jacks, 95 and 97, respectively. Hydraulic jacks 95 and 97 are provided for purposes of elevating the rear end of either the truck or trailer, or the rear ends of both truck and trailer, as necessay to assure proper tail end congruency of the vehicles for coupling and refuse transferral purposes. When not in use, the jacks are carried in their fully retracted positions, as illustrated in FIGURE 1, and they are extended for use in the manner illustrated in FIGURE 3.

After the truck and trailer have been backed together and locked in the above-described manner, the upper and lower tailgate members of each are opened, through proper manipulation of their actuating cylinders, to provide rear end communication between the bodies of the vehicles. The refuse from the truck can now be transferred to the trailer by actuating the cylinder for packer blade 66 to a sufficient extent to permit the blade to shove refuse from the truck into the trailer. After this, the tail ends of the truck and trailer are preferably closed and the vehicles separated by substantially reverse procedures to the back-up and coupling ones described above. The pickup truck is thereafter free to collect more refuse and the trailer to receive another load, or loads, of refuse from one or more pickup trucks, unless it is already full, in which case it can be hauled to a disposal site. It will be apparent that maneuvering of trailer 10 is most easily accomplished with a tractor cab, although supporting wheel assembly 18 can be used to advantage in jockeying the trailer for pickup truck coupling purposes by other than tractor cab means.

While the upper and lower tailgate members of the truck and trailer can be opened and closed in any sequence in the practice of our invention, a preferred closure procedure, after refuse transferral from the truck to the trailer, is to first close the bottom tailgate member, and then the upper one, of the truck, after which the bottom tailgate member, and finally the upper one, of the trailer are closed in that order. In this connection, it is important to note that the leading edge of lower tailgate member 32 of the trailer is beveled to a knife edge and extends, in the closed position illustrated in FIGURE 1, for a distance rearwardly of the trailer approximately equal to the inboard offset distance 69 of the upper (and, as will now be apparent, lower as well) tailgate member of truck 12. Lower tailgate member 32 is purposely designed with such leading edge projection, and its path of travel is so programmed as to swing that edge into contact with the closed rear end of the truck during the here-described tailgate closing operation and before it comes to rest in its FIGURE 1 position. It will thus be seen that closure of the truck and trailer in accordance with the above-indicated sequence of operations results in the lower tailgate member of the trailer swiveling first to near, and then actual, contact with the closed rear end of the truck, after which the member rides to complete closure with its leading edge in scraping contact with that end of the truck.

The reason for employing the above-described sequence of tailgate closing steps is to minimize refuse spillage during the vehicle disengaging procedure following the transfer of refuse from truck 12 to trailer 10. Thus, as the lower tailgate member of the trailer completes the final phases of its closing movement, with its leading edge in near, and then actual, contact with the rear of the truck, it traps and carries loose refuse with it, plowing most of this into the interior of the trailer in the process. While the final trailer-closing step of lowering tailgate 30 over the upper part of the rear trailer opening sometimes results in loose refuse being pinched from the main body of trash and lodged in the cramped space between the truck and trailer, above the projecting edge of the lower tailgate member of the trailer, to spill when the truck and trailer subsequently pull apart, the resulting spillage is minimal and much less than would occur were a vertically travelling tailgate member assembly substituted for the trailer 10 assembly.

In the latter connection, however, it is not essential to our invention that lower tailgate member 32 function exactly as described, and it can function in other ways so long as the aims of the invention are not thereby frustrated. Such deviation can, for example, manifest itself in lack of contact between the lower tailgate member of the trailer and the rear end of the truck during all, or nearly all, of the closing movement of the former, providing there is sufficient proximity of the involved parts at time, or times, to insure functioning of the apparatus in the general manner, and with substantially the results, taught herein. In broader vein, it is even within the scope of our invention to employ completely different tailgate assemblies and control techniques from those specifically disclosed herein, or different parts from some or all of the parts shown in the drawing, so long as the over-all aims of the invention are thereby accomplished in essentially the manner taught herein, even though such accomplishment be less efficiently achieved than it might otherwise be.

This invention has been described in considerable detail in order to comply with the patent laws by providing a full public disclosure of at least one of its forms, however, such detailed disclosure is not intended to in any way limit the broad features or principles of the invention, or the scope of patent monopoly sought to be granted. Accordingly while the invention has been herein illustrated and described in what is conceived to be a preferred and practical form, it is emphasized that departures may be made therefrom within the scope of the invention. Certain of these departures have already been mentioned and others will occur to those skilled in the art in the light of present teachings. Exemplary of the latter are noncritical variations of the shapes of various parts of the subject refuse disposal equipment; the elimination of certain structural, or other, features of said equipment not critically essential to its proper use and functioning; the addition of useful, but noncritical, accessories to the equipment; etc.

As a specific example of the kind of equipment modification above contemplated, trailer 10 and truck 12 could have accessory male and female fittings so designed and positioned as to mate and guide the two vehicles to proper coupling alignment for purposes of the present invention, many specific embodiments of which will be suggested by these teachings to those skilled in the art. Another example of such equipment modification results from the substitution of a single acting pusher blade assembly for the double acting one of trailer 10, or even the substitution of a tilt-bed vehicle with no pusher blade at all for trailer 10, since any carrier vehicle capable of being unloaded, regardless of how, can be employed for purposes of our invention so long as it has the necessary tailgate design to adapt it for the refuse transfer utility taught herein.

While little has heretofore been said about materials of construction for the various parts of our refuse handling vehicles, nothing need here be added since the selection of such materials is well within the capabilities of those skilled in the art in the light of present teachings. Finally, the novel refuse handling vehicles of our invention are not limited to refuse disposal usage and they can be employed in any capacity of which they are capable, whether or not it involves refuse handling.

We claim:

1. A pair of vehicle bodies of generally rectangular cross section having rear openings with tailgate-type closure members adjusted between open and closed positions when the bodies are mounted for vehicular service said bodies being capable of meeting in rear end adjacency and congruency and substantial alignment when so mounted and said closure members being physically characterized, functionally operative and provided with the necessary control, and other accessory, means to permit them to be opened and closed when said vehicle bodies are mounted for vehicular service and disposed in the above-indicated positions of rear end adjacency;
   (a) said vehicle bodies having accessory coupling means comprising components which cooperate to link, and hold them together when they are mounted for vehicular service and disposed in said positions of rear and adjacency;
   (b) said vehicle bodies comprising;
      (1) a first vehicle body of a type suitable for use, when mounted on an appropriate chassis to form a first vehicle, as pickup means for the collection of refuse; and
      (2) a second vehicle body which forms a semitrailer-type vehicle when mounted on an appropriate chassis, said second vehicle body having a load capacity greater than that of the first one;
   (c) said first vehicle body being of an enclosed form and having an accessory packing blade assembly, the blade of said assembly being congruently operable in a rearward direction within the vehicle body, said packer blade assembly having adequate power and blade reach to permit it, when actuated, to force refuse from the first vehicle body when the latter is mounted on a chassis to form said first vehicle; and
   (d) said second vehicle body having an accessory pusher blade assembly with a blade operable in the proper direction therewithin, and being otherwise adapted, to serve a refuse unloading function when said vehicle body is mounted on an appropriate chassis to form the aforesaid semitrailer-type vehicle;
   (e) the aforesaid tailgate-type closure members of said vehicle bodies comprising, in the case of said first vehicle body, an upper and a lower tailgate member, each of substantially flat form, the two members being disposed in a common plane perpendicular to the longitudinal axis of the vehicle body and being so mounted and movable as to meet along lower and upper edges, respectively, when closed, and to travel vertically oppositely away from each other to substantially total clearance of the rear opening of the first vehicle body when urged to their open positions and said vehicle body is so mounted on an appropriate chassis as to form said first vehicle; and, in the case of the second vehicle body, an upper and a lower tailgate member, each of substantially flat form, the former being disposed in a plane near the rear opening, and perpendicular to the longitudinal axis, of the vehicle body and vertically movable between open and closed positions, and the latter movable between an open position in which it is horizontally disposed at substantially the floor level of the vehicle body and a closed position in which it slopes from upper adjacency (near its rearwardly disposed edge) to the lower edge boundary of the closed upper tailgate member to the floor of said vehicle body, the slope direction being upward from said floor and rearward within the vehicle body, when said vehicle body is so mounted on an appropriate chassis as to form said semitrailer-type vehicle.

2. A pair of vehicle bodies in accordance with claim 1 in which each tailgate member of each vehicle body is powered by a pair of properly positioned hydraulic cylinders operatively connected therewith and designed for use in such fashion as to permit opening and closing of the tailgate members on an individual basis.

3. A pair of vehicle bodies in accordance with claim 2 in which the upper and lower tailgate members of said first vehicle body are situated inboard of its rear extremity a relatively short distance;
   (a) the rearwardly disposed edge of the lower tailgate member of the second vehicle body extends outwardly from the rear extremity of the main part of said body a distance substantially equal to the relatively short distance of the tailgate members of said first vehicle body from its rear extremity when said lower tailgate member is in its closed position;
   (b) said lower tailgate member of said second vehicle body is sized to fit crosswise, without binding, into the space between the rear end of the main portion of said second vehicle body and the closed tailgate members of said first vehicle body, when the two vehicles are mounted on chassis to form said semitrailer-type and said first vehicles, and the two vehicles are coupled together in the aforesaid positions of rear end adjacency; and
   (c) said lower tailgate member of said second vehicle body swings from its open to its closed position through a path which carries its rearwardly disposed edge into the aforesaid space between the rear end of the main portion of the second vehicle body and the closed tailgate members of the first vehicle body when the two bodies are mounted on chassis to form the aforesaid vehicles, and the latter are coupled in said positions of rear end adjacency, to eventual adjacency with a tailgate member of said first vehicle body when the tailgate members of the body are closed.

4. A pair of vehicle bodies in accordance with claim 1, each characterized by the presence of an attached guide and support member for its upper tailgate member, said guide and support member being adjustable between an upright position and a folded position against the top of the vehicle body to which it is attached, and being situated to receive, in its upright position, an upper tailgate member, as the latter moves vertically upwardly from its closed position to its fully opened position.

5. A pair of vehicle bodies of generally rectangular cross section having rear openings with tailgate-type closure members adjustable between open and closed positions when the bodies are mounted for vehicular services, said bodies being capable of meeting in rear end adjacency and congruency and substantial alignment when so mounted and said closure members being physically characterized, functionally operative and provided with the necessary control, and other accessory, means to permit them to be opened and closed when said vehicle bodies are mounted for vehicular service and disposed in the above-indicated positions of rear end adjacency;

(a) said vehicle bodies having accessory coupling means comprising components which cooperate to link and hold them together when they are mounted for vehicular service and disposed in said positions of rear end adjacency;
(b) said vehicle bodies comprising:
  (1) a first vehicle body of a type suitable for use, when mounted on an appropriate chassis to form a first vehicle, as pickup means for the collection of refuse; and
  (2) a second vehicle body which forms a semitrailer-type vehicle when mounted on an appropriate chassis, said second vehicle body having a load capacity greater than that of the first one;
(c) said first vehicle body being of an enclosed form and having an accessory packing blade assembly, the blade of said assembly being congruently operable in a rearward direction within the vehicle body, said packer blade assembly having adequate power and blade reach to permit it, when actuated, to force refuse from the first vehicle body when the latter is mounted on a chassis to form said first vehicle; and
(d) said second vehicle body having an accessory pusher blade assembly with a blade operable in the proper direction therewith, and being otherwise adapted, to serve a refuse unloading function when said vehicle body is mounted on an appropriate chassis to form the aforesaid semitrailer-type vehicle;
(e) said pair of vehicle bodies having hydraulic jacks dependently secured underneath, and near the rear of, their bottoms, the jacks being of such size, and so otherwise characterized, as to permit elevational adjustment of the rear ends of said bodies when they are mounted on appropriate chassis to form said first and said semitrailer-type vehicles, respectively, to bring the bodies into proper adjacency for coupling in the above-indicated manner.

6. A pair of vehicle bodies of generally rectangular cross section having rear openings with tailgate-type closure members adjustable between open and closed positions when the bodies are mounted for vehicular service, said bodies being capable of meeting in rear end adjacency and congruency and substantial alignment when so mounted and said closure members being physically characterized, functionally operative and provided with the necessary control, and other accessory, means to permit them to be opened and closed when said vehicle bodies are mounted for vehicular service and disposed in the above-indicated positions of rear end adjacency;
(a) said vehicle bodies having accessory coupling means comprising components which cooperate to link, and hold, them together when they are mounted for vehicular service and disposed in said positions of rear end adjacency;
(b) said vehicle bodies comprising:
  (1) a first vehicle body of a type suitable for use, when mounted on an appropriate chassis to form a first vehicle, as pickup means for the collection of refuse; and
  (2) a second vehicle body which forms a semitrailer-type vehicle when mounted on an appropriate chassis, said second vehicle body having a load capacity greater than that of the first one;
(c) said first vehicle body being of an enclosed form and having an accessory packing blade assembly, the blade of said assembly being congruently operable in a rearward direction within the vehicle body, said packer blade assembly having adequate power and blade reach to permit it, when actuated, to force refuse from the first vehicle body when the latter is mounted on a chassis to form said first vehicle; and
(d) said second vehicle body having an accessory pusher blade assembly with a blade operable in the proper direction therewithin, and being otherwise adapted, to serve a refuse unloading function when said vehicle body is mounted on an appropriate chassis to form the aforesaid semitrailer-type vehicle.

References Cited
UNITED STATES PATENTS

| | | | |
|---|---|---|---|
| 2,478,658 | 8/1949 | Harbers | 214—38 |
| 2,934,198 | 4/1960 | Schonrock | 214—41 X |
| 3,013,675 | 12/1961 | Schonrock | 214—38 X |
| 3,059,789 | 10/1962 | Bowles | 214—41 |
| 3,247,983 | 4/1966 | Thompson | 214—38 |

ROBERT G. SHERIDAN, *Primary Examiner.*

U.S. Cl. X.R.

214—82; 296—51, 52, 57